US012620876B2

(12) United States Patent　　　　(10) Patent No.:　US 12,620,876 B2

Kusaka　　　　　　　　　　　　　　　(45) Date of Patent:　May 5, 2026

(54) DRIVE APPARATUS

(71) Applicant: TOYOTA JIDOSHA KABUSHIKI KAISHA, Toyota (JP)

(72) Inventor: Hiroto Kusaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 18/400,853

(22) Filed: Dec. 29, 2023

(65) Prior Publication Data

US 2024/0266927 A1　　Aug. 8, 2024

(30) Foreign Application Priority Data

Feb. 8, 2023　(JP) ................................. 2023-017909

(51) Int. Cl.
　*H02K 11/33*　　　(2016.01)
　*H02K 11/30*　　　(2016.01)
　*B60K 1/04*　　　(2019.01)

(52) U.S. Cl.
　CPC ............. *H02K 11/33* (2016.01); *H02K 11/30* (2016.01); *B60K 1/04* (2013.01); *H02K 2213/12* (2013.01)

(58) Field of Classification Search
　CPC .......... B60K 6/405; B60K 1/04; H02K 5/225; H02K 11/33; H02K 11/30; H02K 2213/12; H02K 7/116; H02K 5/00; H02K 5/04
　USPC .................................................. 310/89, 71
　See application file for complete search history.

(56) References Cited

U.S. PATENT DOCUMENTS

| 2007/0144822 A1* | 6/2007 | Tominaga ............ B62D 5/0406 |
| | | 180/444 |
| 2010/0065349 A1 | 3/2010 | Ichikawa et al. |
| 2016/0248302 A1 | 8/2016 | Nagao et al. |
| 2018/0290530 A1 | 10/2018 | Chai et al. |
| 2021/0057964 A1 | 2/2021 | Kiyomihara et al. |
| 2021/0086635 A1 | 3/2021 | Ueda |
| 2022/0345009 A1 | 10/2022 | Yokozawa et al. |

FOREIGN PATENT DOCUMENTS

| CN | 217362776 U | 9/2022 |
| EP | 0 351 272 A1 | 1/1990 |
| EP | 0 351 272 B1 | 1/1994 |
| JP | 2008-187884 A | 8/2008 |
| JP | 6327174 B2 | 5/2018 |
| JP | 2021-030811 A | 3/2021 |
| JP | 2021-048748 A | 3/2021 |
| JP | 2021-061675 A | 4/2021 |
| JP | 2022-168575 A | 11/2022 |

* cited by examiner

*Primary Examiner* — Alexander A Singh
(74) *Attorney, Agent, or Firm* — Finnegan, Henderson, Farabow, Garrett and Dunner, LLP

(57)　　　　　　　ABSTRACT

A drive apparatus is provided, including: an electric motor; a gear that is mechanically connected to the electric motor; an electric power control unit that is electrically connected to the electric motor; and a casing that houses the electric motor, the gear, and the electric power control unit. The casing includes a fixation portion to which an electric unit for function expansion is attached in a detachable manner and a connection portion by which the electric unit fixed to the fixation portion is electrically connected to the electric power control unit.

9 Claims, 6 Drawing Sheets

FIG. 3

DRIVE APPARATUS

CROSS-REFERENCE TO RELATED APPLICATION

This application claims priority to Japanese Patent Application No. 2023-017909 filed on Feb. 8, 2023, incorporated herein by reference in its entirety.

BACKGROUND

1. Technical Field

The technology disclosed in the present specification relates to a drive apparatus.

2. Description of Related Art

Japanese Unexamined Patent Application Publication No. 2021-048748 discloses a mechatronically-integrated electric power conversion device including an electric motor, a power drive unit that controls actuation of the electric motor, and a transmission that is interlocked and coupled with a rotation shaft of the electric motor. In the mechatronically-integrated electric power conversion device, a casing that houses the electric motor and the power drive unit and a transmission case that houses the transmission are coupled with each other.

SUMMARY

To this kind of mechatronically-integrated electric power conversion device, an electric unit for function expansion is sometimes attached. The present disclosure provides a novel technology for attaching the electric unit to the casing of the mechatronically-integrated electric power conversion device.

An aspect of the present disclosure relates to a drive apparatus including an electric motor, a gear, an electric power control unit, and a casing. The gear is mechanically connected to the electric motor. The electric power control unit is electrically connected to the electric motor. The casing houses the electric motor, the gear, and the electric power control unit. The casing includes a fixation portion to which an electric unit for function expansion is attached in a detachable manner and a connection portion by which the electric unit fixed to the fixation portion is electrically connected to the electric power control unit.

With the drive apparatus in the aspect of the present disclosure, the casing that houses the electric motor, the gear, and the electric power control unit includes the fixation portion and the connection portion. The electric unit for function expansion that is fixed to the fixation portion can be electrically connected to the electric power control unit by the connection portion of the casing. Further, the electric unit is attached to the fixation portion in a detachable manner. Therefore, in the drive apparatus, the electric unit can be easily attached to the casing through the fixation portion and the connection portion. Furthermore, the electric unit can be easily detached. Thereby, the versatility of the drive apparatus can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 shows a perspective view of the other drive apparatus shown in FIG. 1;

DETAILED DESCRIPTION OF EMBODIMENTS

In an embodiment of the present technology, the electric unit includes a direct-current converter circuit, an alternating-current charge circuit, and a high-voltage branch circuit. In another embodiment, the electric unit may include only the direct-current converter circuit. Furthermore, in another embodiment, the electric unit may include only the alternating-current charge circuit, or may include only the high-voltage branch circuit.

In an embodiment of the present technology, the electric power control unit may be disposed along a first surface of the casing. In that case, the electric unit may be attached to a second surface of the casing by the fixation portion, the second surface being adjacent to the first surface. In another embodiment, the electric unit may be attached to the first surface of the casing.

In an embodiment of the present technology, the drive apparatus may further include the electric unit that is attached to the casing. In another embodiment, the drive apparatus may exclude the electric unit.

In an embodiment of the present technology, the drive apparatus may be equipped in a vehicle that includes a battery. In that case, one unit of the electric power control unit and the electric unit may be directly connected to the battery, and the other unit of the electric power control unit and the electric unit may be connected to the battery through the one unit. In this configuration, both of the electric power control unit and the electric unit can be connected to the battery, by a simpler structure, compared to a configuration in which each of the electric power control unit and the electric unit is directly connected to the battery, for example.

Figure 1:
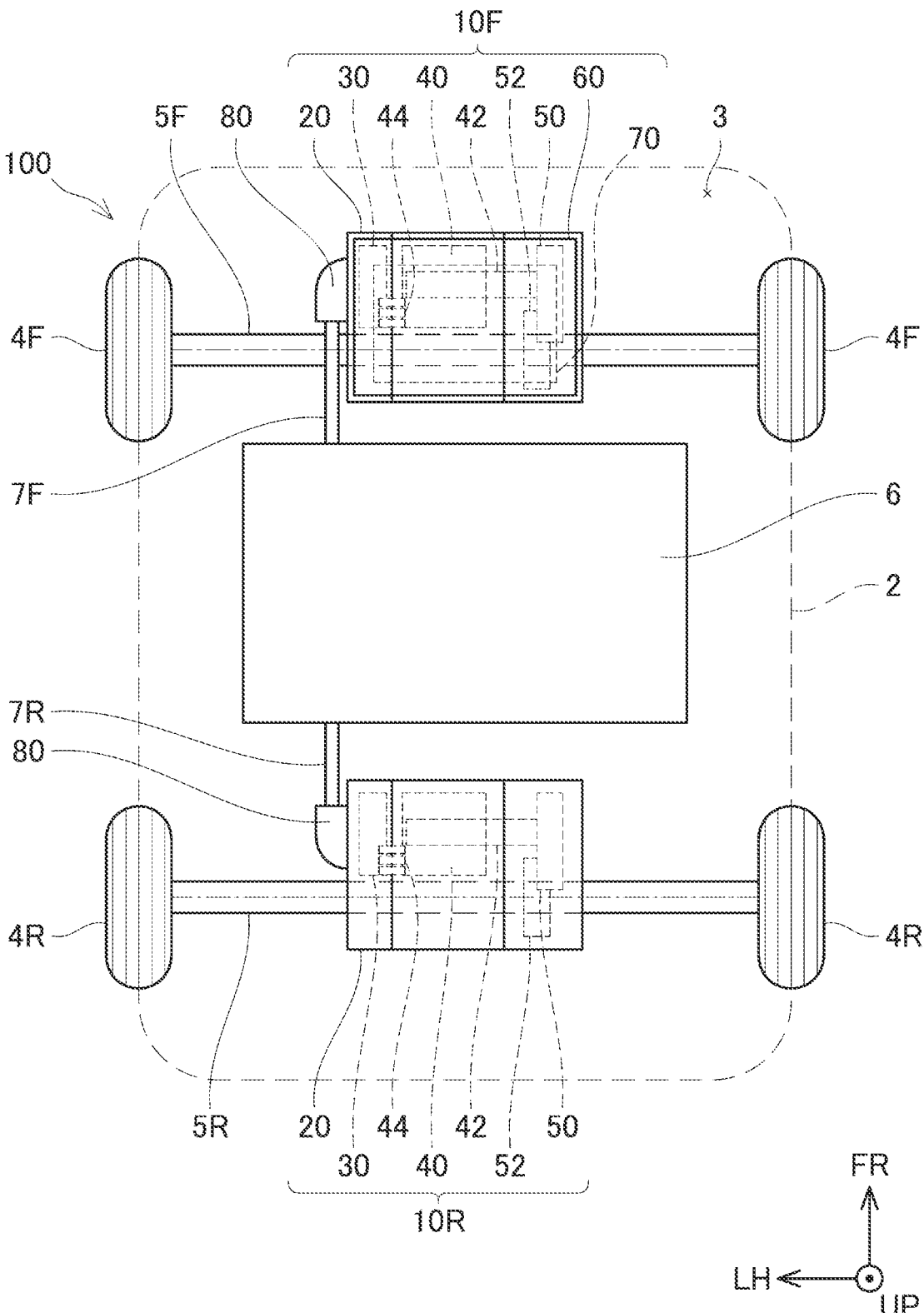
FIG. 1 shows a plan view of an electrified vehicle that is equipped with two drive apparatuses according to a first embodiment of the present disclosure.

A first embodiment of the present disclosure will be described below. FIG. 1 shows a plan view of an electrified vehicle 100 that is equipped with drive apparatuses 10F, 10R in the first embodiment. In addition to the drive apparatuses 10F, 10R, the electrified vehicle 100 includes a vehicle body 2, a front drive shaft 5F, a pair of front wheels 4F, a rear drive shaft 5R, a pair of rear wheels 4R, and a battery 6. To facilitate understanding, in FIG. 1, the vehicle body 2 of the electrified vehicle 100 is shown by a broken line. The electrified vehicle 100 in the present specification includes a fuel cell electric vehicle, in addition to a battery electric vehicle. In the coordinate system in the figure, FR indicates the forward direction of the electrified vehicle 100, UP indicates the upward direction of the electrified vehicle 100, and LH indicates the leftward direction of the electrified vehicle 100. Hereinafter, based on the coordinate system in the figure, "upper", "lower", "left", "right", "front", and "rear" will be described.

The pair of front wheels 4F is provided at both ends of the front drive shaft 5F, and the pair of rear wheels 4R is provided at both ends of the rear drive shaft 5R.

The battery 6 is disposed at a lower portion of the vehicle body 2 of the electrified vehicle 100. The battery 6 supplies electric power to the drive apparatuses 10F, 10R. The battery 6 incorporates a plurality of secondary battery cells (not illustrated) such as lithium-ion cells, for example, and is configured so as to be capable of being repeatedly charged and discharged. The drive apparatuses 10F, 10R can function also as electric power generators for the regenerative braking of the electrified vehicle 100. The electric power generated by the drive apparatuses 10F, 10R is supplied to the battery 6, so that the battery 6 is charged.

The drive apparatus 10F is positioned within a front compartment 3 of the electrified vehicle 100. The drive apparatus 10F drives the pair of front wheels 4F through the front drive shaft 5F of the electrified vehicle 100. The drive apparatus 10F includes an electric power control unit 30, a motor 40, a ring gear 50, a differential gear 52, a casing 20 housing the devices 30, 40, 50, 52, and an electric unit 60. The ring gear 50 and the differential gear 52 are an example of the "gear" in the present disclosure. The motor 40 is an example of the "electric motor" in the present disclosure.

The electric power control unit 30 includes a multiphase voltage converter circuit, an inverter circuit, and a controller. The electric power control unit 30 is also referred to as a power control unit (PCU). The electric power control unit 30 is electrically connected to the motor 40.

The motor 40 is a motor for the traveling of the electrified vehicle 100, and includes a motor shaft 42 and bus bars 44. The motor shaft 42, which is a rotation shaft of the motor 40, extends rightward, and is connected to the ring gear 50. A stator coil of the motor 40 is electrically connected to the electric power control unit 30 through three bus bars 44.

The ring gear 50 and the differential gear 52 engage with each other. The differential gear 52 is connected to the front drive shaft 5F. Thereby, the rotation motion of the motor 40 is transmitted to the front drive shaft 5F through the motor shaft 42, the ring gear 50, and the differential gear 52.

Within the casing 20, the devices 30, 40, 50, 52 are arrayed along a direction in which the motor shaft 42 extends, in the order of the electric power control unit 30, the motor 40, and the ring gear 50 from the left.

The electric unit 60 is attached to an upper portion of the casing 20. The electric unit 60 is a device for expanding the function of the drive apparatus 10F. The electric unit 60 includes a function expansion circuit 70. Although details will be described with reference to FIG. 2, the function expansion circuit 70 of the electric unit 60 is connected to the battery 6 through a PN connector 80 and a power cable 7F.

The drive apparatus 10R is positioned below a rear seat (not illustrated) of the electrified vehicle 100, and is disposed above a rear suspension member (not illustrated). As a modification, the drive apparatus 10R may be positioned below a board that constitutes a bottom surface of a luggage space of the electrified vehicle 100. The drive apparatus 10R drives the pair of rear wheels 4R through the rear drive shaft 5R of the electrified vehicle 100. The drive apparatus 10R does not include the electric unit 60. However, except this point, the drive apparatus 10R has the same configuration as the drive apparatus 10F. The drive apparatus 10R is connected to the battery 6 through a PN connector 80 and a power cable 7R.

The structure of the drive apparatus 10F will be described with reference to FIG. 2. Particularly, a structure for attaching the electric unit 60 to the casing 20 will be described. The electric unit 60 includes an electric casing 61 having a box shape. The electric casing 61 includes four attachment portions 62 that extend downward from four corners of a lower side surface of the electric casing 61. Through-holes are provided at lower end portions of the attachment portions 62. Furthermore, a first communication hole 66 that provides communication between the interior and exterior of the electric casing 61 is provided on the lower side surface of the electric casing 61. A positive electrode bus bar 72P and negative electrode bus bar 72N that extend downward from the function expansion circuit 70 are inserted into the first communication hole 66. The bus bars 72P, 72N pass through the first communication hole 66, and extend downward toward the casing 20.

The electric casing 61 houses the function expansion circuit 70. The function expansion circuit 70 is a circuit for expanding the function of the drive apparatus 10F. Specifically, the function expansion circuit 70 includes a direct-current converter circuit 70D, an alternating-current charge circuit 70A, and a high-voltage branch circuit 70P. The direct-current converter circuit 70D is a device that steps down the voltage of the battery 6 and supplies the voltage to an auxiliary machine battery (not illustrated). The alternating-current charge circuit 70A is a device that converts alternating-current power input from an alternating-current power feeding machine in the exterior into direct-current power and supplies the direct-current power to the battery 6. The high-voltage branch circuit 70P is a device that distributes and supplies electric power to a portion that requires high-voltage power, for example, to the motor 40 or the like. The "high-voltage" means an operating voltage that is a direct-current voltage of higher than 60 V and equal to or lower than 1500 V or an alternating-current voltage of higher than 30 V (effective value) and equal to or lower than 1000 V (effective value).

A first service hole 64 is provided on a left side surface of the electric casing 61. The first service hole 64 provides communication between the interior and exterior of the electric casing 61. The first service hole 64 faces a first positive electrode terminal 74P and first negative electrode terminal 74N of the function expansion circuit 70.

The first service hole 64 is covered from the outside, with the PN connector 80. The PN connector 80 includes a positive electrode cable 87P, a connector positive electrode terminal 82P, a negative electrode cable 87N, and a connector negative electrode terminal 82N. The positive electrode cable 87P is a cable that connects the connector positive electrode terminal 82P and the positive electrode of the battery 6. The negative electrode cable 87N is a cable that connects the connector negative electrode terminal 82N and the negative electrode of the battery 6.

The connector positive electrode terminal 82P of the PN connector 80 is attached to the first positive electrode terminal 74P of the function expansion circuit 70 by a bolt B1. Similarly, the connector negative electrode terminal 82N of the PN connector 80 is attached to the first negative electrode terminal 74N of the function expansion circuit 70 by a bolt B1. After the terminals 82P, 82N of the PN connector 80 are attached to the terminals 74P, 74N of the function expansion circuit 70, an opening 84 of the PN connector 80 is covered with a connector cover 88. In this way, the function expansion circuit 70 is electrically connected to the battery 6 by the PN connector 80.

The casing 20 has a box shape that extends in the right-left direction. Four fixation portions 22 that extend upward are provided at four corners of an upper side surface 23 of the casing 20. The four fixation portions 22 have the same structure. A fixation portion 22 positioned on the front side and positioned on the right side will be mainly described below.

Openings are provided on an upper side surface and front side surface of the fixation portion 22. The attachment portion 62 of the electric casing 61 is inserted into the opening on the upper side surface of the fixation portion 22, from above. The attachment portion 62 inserted into the fixation portion 22 is fixed to the casing 20 by a bolt B2 that passes through the opening on the front side surface of the fixation portion 22. In the drive apparatus 10F, to each of the four fixation portions 22, the corresponding attachment portion 62 is fixed. Further, by detaching the bolts B2 from the four fixation portions 22, it is possible to easily detach the electric unit 60 from the casing 20. In this way, the fixation portions 22 of the casing 20 attach the electric unit 60 in a detachable manner.

A second communication hole 26 that provides communication between the exterior and interior of the casing 20 is provided on the upper side surface 23 of the casing 20. The second communication hole 26 faces the first communication hole 66 of the electric casing 61. Therefore, the positive electrode bus bar 72P and negative electrode bus bar 72N passing through the first communication hole 66 and extending downward pass through the second communication hole 26. A lower end of the positive electrode bus bar 72P passing through the second communication hole 26 is attached to a second positive electrode terminal 32P of the electric power control unit 30 by a bolt B1, within the casing 20. A lower end of the negative electrode bus bar 72N passing through the second communication hole 26 is attached to a second negative electrode terminal 32N of the electric power control unit 30 by a bolt B1, within the casing 20. A second service hole 24 facing a second positive electrode terminal 32P and a second negative electrode terminal 32N is provided on a left side surface 21 of the casing 20. After the bus bars 72P, 72N of the function expansion circuit 70 are attached to the terminals 32P, 32N of the electric power control unit 30, the second service hole 24 of the casing 20 is covered with a service cover 28. In this way, the second communication hole 26 of the casing 20 electrically connects the function expansion circuit 70 of the electric unit 60 fixed to the fixation portions 22, to the electric power control unit 30.

Figure 2:
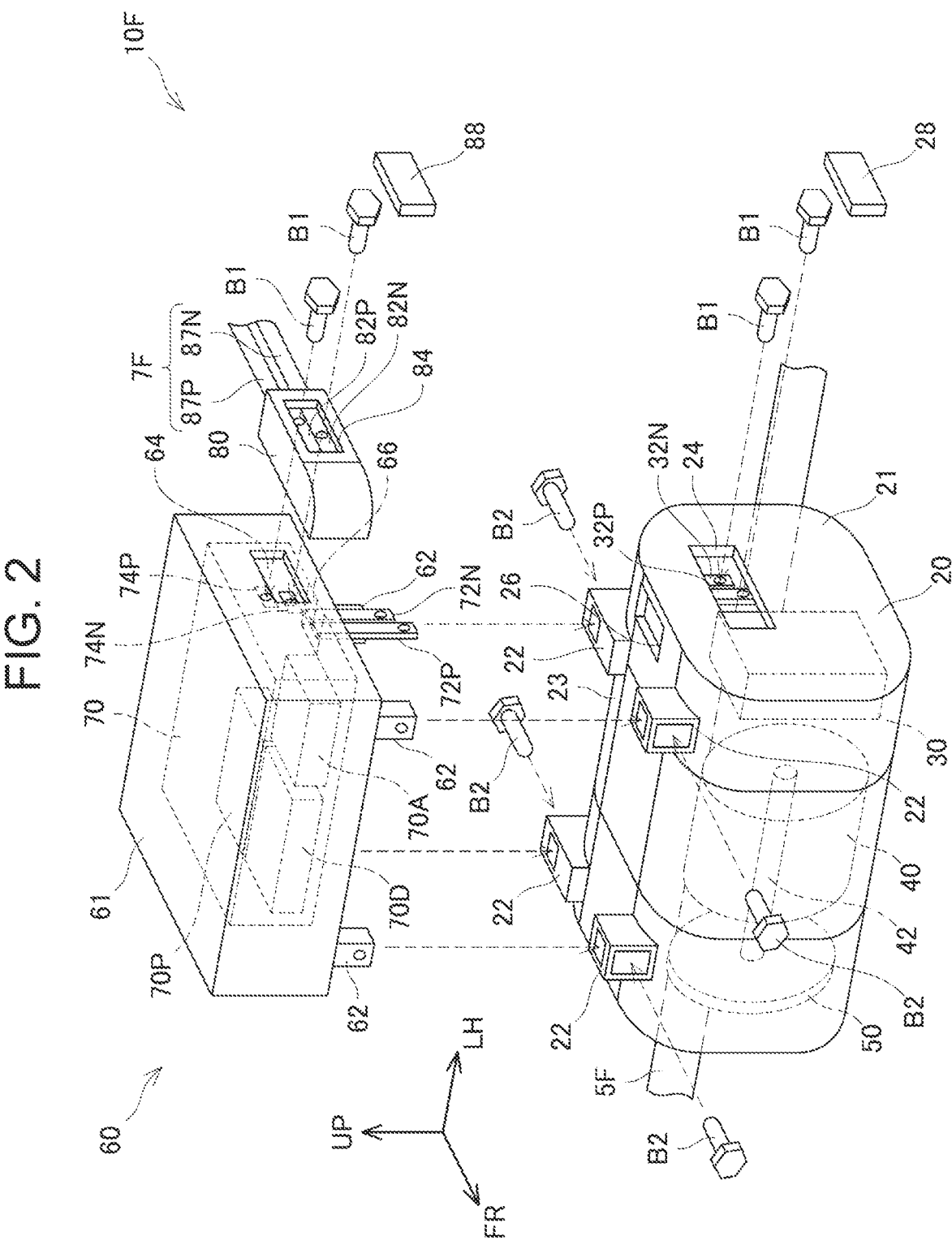
FIG. 2 shows an exploded perspective view of one drive apparatus shown in FIG. 1.

As shown in FIG. 2, in the drive apparatus 10F, the electric power control unit 30 is disposed along the left side surface 21, that is, along the vertical direction. Furthermore, the electric unit 60 is attached to an upper side surface 23 that is adjacent to the left side surface 21.

In the drive apparatus 10F in the first embodiment, the electric unit 60 is directly connected to the battery 6 through the PN connector 80, and the electric power control unit 30 is connected to the battery 6 through the electric unit 60. Thereby, both of the electric unit 60 and the electric power control unit 30 can be connected to the battery 6, by a simpler structure, compared to a configuration in which the PN connector 80 is connected to each of the electric unit 60 and the electric power control unit 30 and in which each of the electric unit 60 and the electric power control unit 30 is directly connected to the battery 6.

Figure 3:
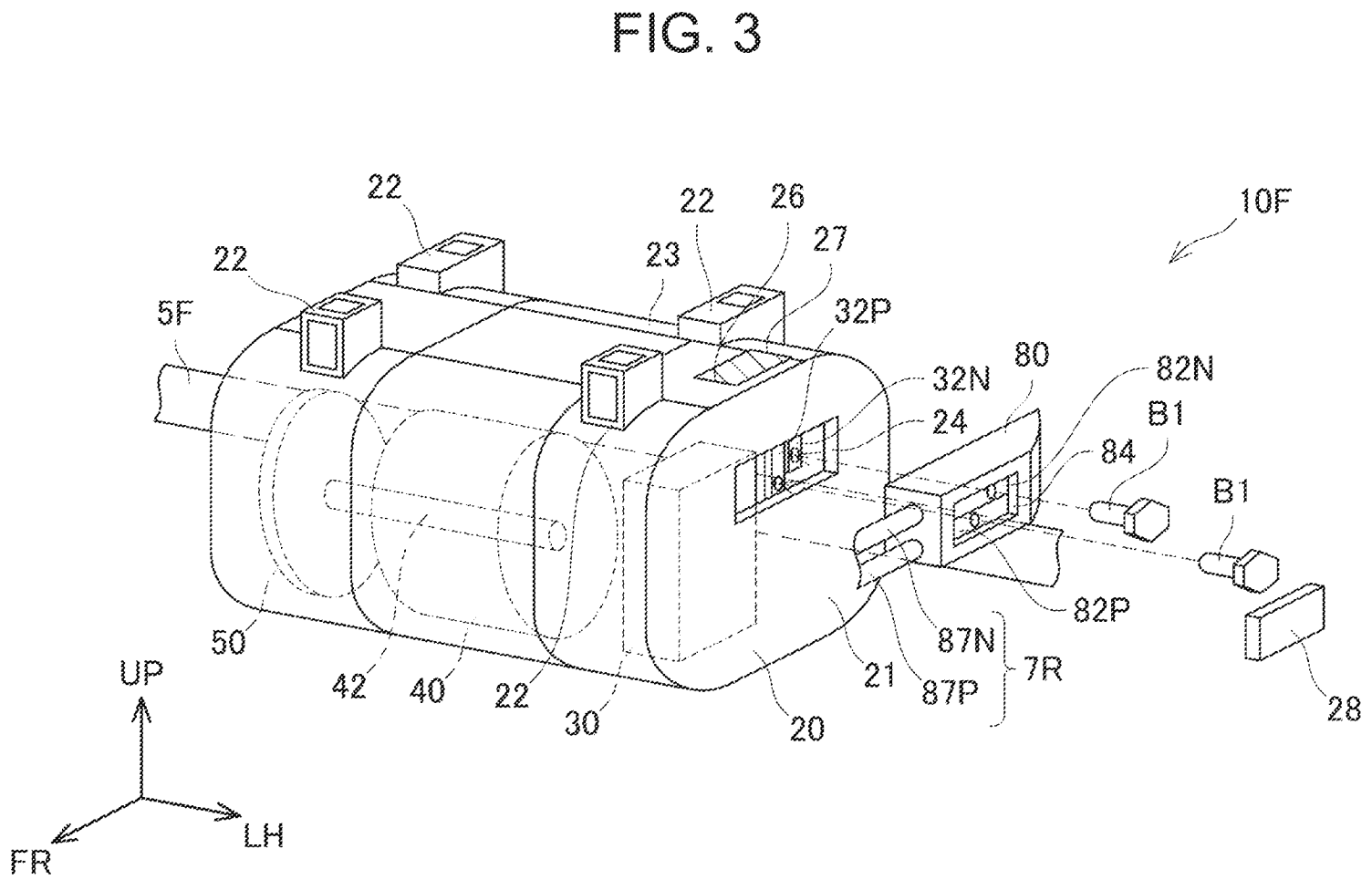

The structure of the drive apparatus 10R will be described with reference to FIG. 3. The drive apparatus 10R does not include the electric unit 60. Therefore, the second communication hole 26 of the casing 20 of the drive apparatus 10R is covered with a communication hole cover 27. Further, in the drive apparatus 10R, the PN connector 80 is attached to the electric power control unit 30 through the second service hole 24. Thereby, the drive apparatus 10R is electrically connected to the battery 6.

In this way, in the first embodiment, the same drive apparatus can be employed for the drive apparatus 10F that includes the electric unit 60 and the drive apparatus 10R that does not include the electric unit 60. Thereby, the versatility of the drive apparatus can be increased, and therefore the production cost can be reduced. Further, since the electric unit 60 is directly attached to the upper side surface 23 of the casing 20, the size of the drive apparatus 10F can be reduced compared to the related art in which another structure body for attaching the electric unit 60 to the vehicle body 2 is included.

In the first embodiment, the second communication hole 26 of the casing 20 is an example of the "connection portion" in the present disclosure. The left side surface 21 is an example of the "first surface" in the present disclosure. The upper side surface 23 is an example of the "second surface" in the present disclosure.

Figure 4:
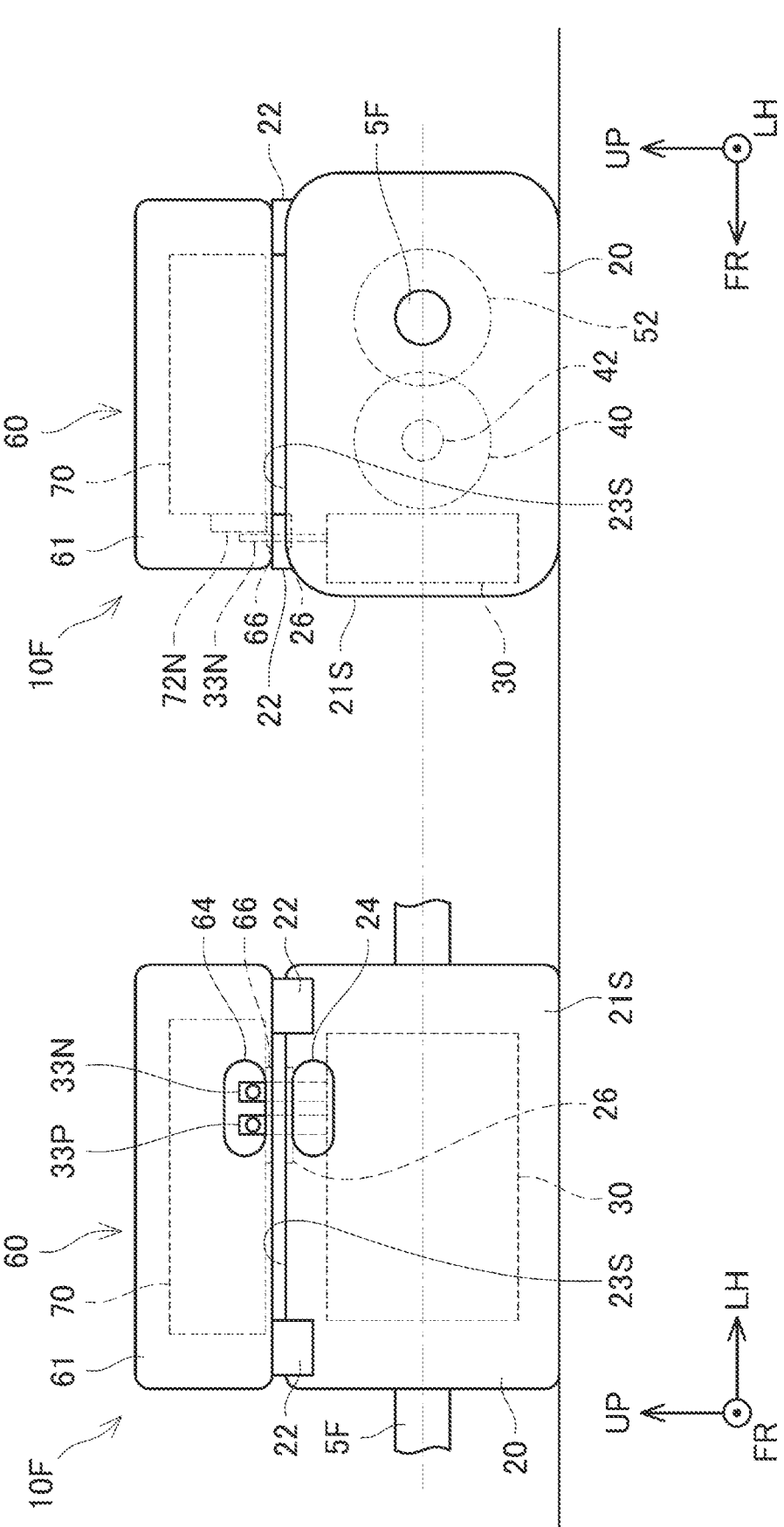
FIG. 4 shows a front view and lateral view of a drive apparatus in a second embodiment of the present disclosure.
Figure 5:
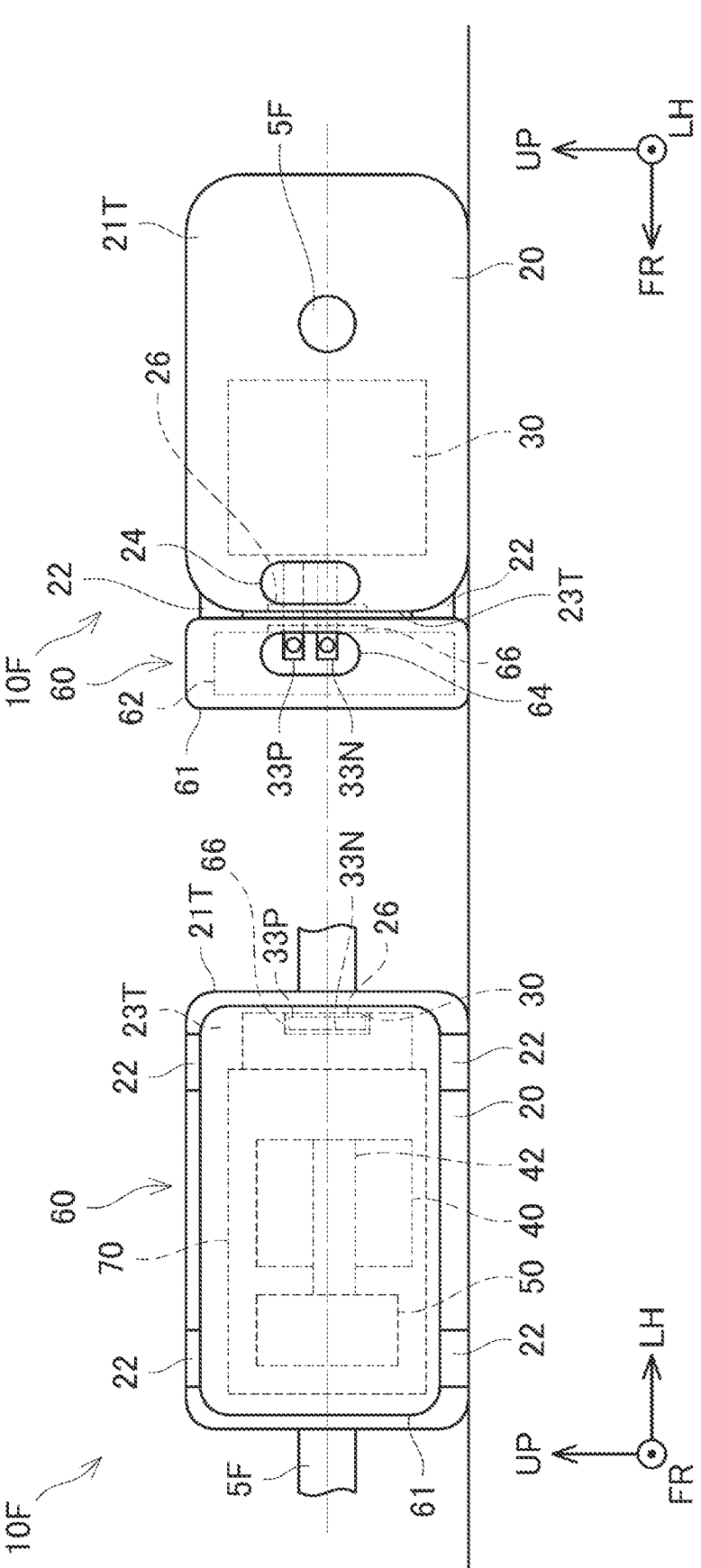
FIG. 5 shows a front view and lateral view of a drive apparatus in a third embodiment of the present disclosure.
Figure 6:
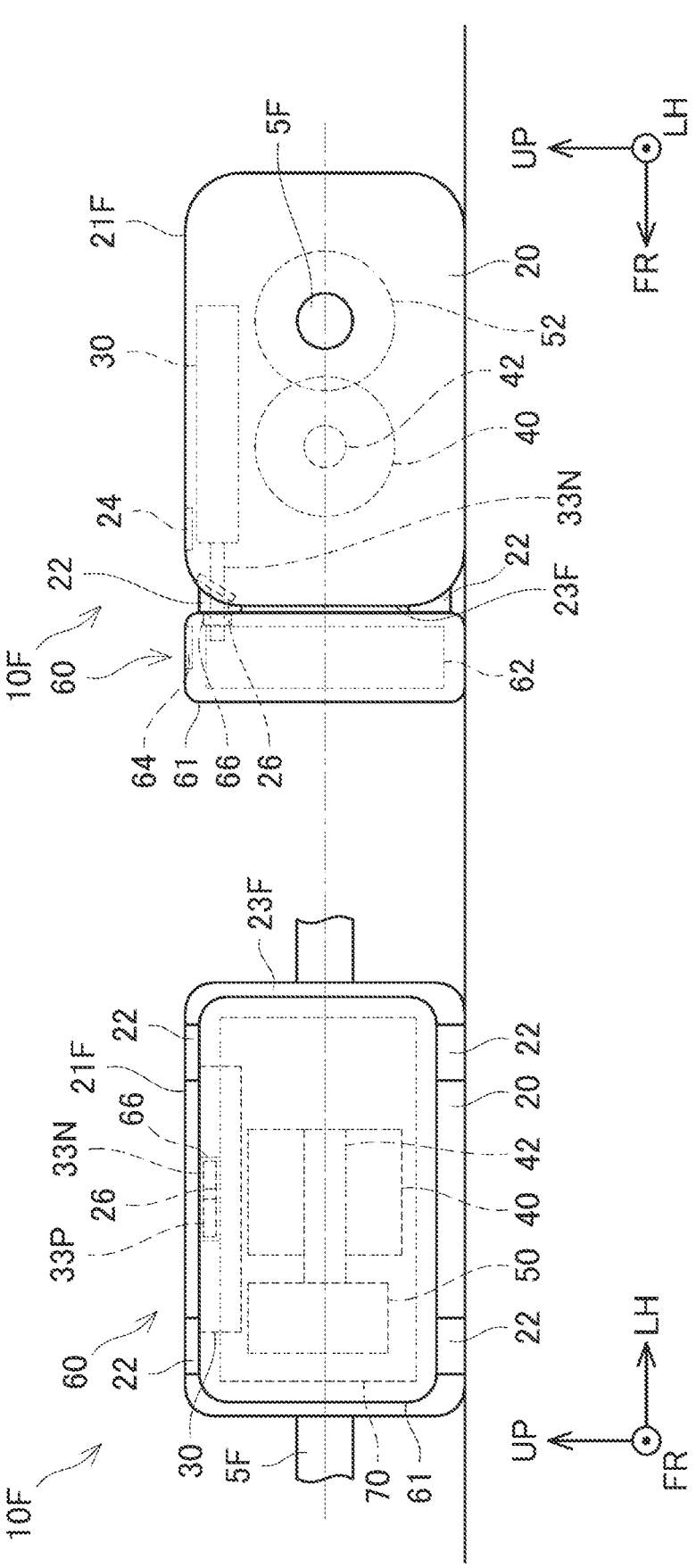
FIG. 6 shows a front view and lateral view of a drive apparatus in a fourth embodiment of the present disclosure.

Drive apparatuses 10F in other embodiments will be described below with reference to FIG. 4 to FIG. 6. The drive apparatuses 10F in the embodiments described below are different from the above-described drive apparatus 10F in the first embodiment, in the position of the electric power control unit 30 within the casing 20. However, as for the other configurations, the drive apparatuses 10F in the embodiments described below has the same configurations as the drive apparatus 10F in the first embodiment.

Next, the structure of a drive apparatus 10F in a second embodiment will be described with reference to FIG. 4. In the drive apparatus 10F in the second embodiment, the electric power control unit 30 is positioned forward of the motor 40. In the second embodiment, the electric power control unit 30 is disposed along a front side surface 21S of the casing 20. Therefore, in the casing 20 in the second embodiment, the second service hole 24 is provided on the front side surface 21S. Furthermore, the electric unit 60 is attached to an upper side surface 23S of the casing 20. In the drive apparatus 10F in the second embodiment, a positive electrode bus bar 33P and negative electrode bus bar 33N provided in the electric power control unit 30 pass through the second communication hole 26 and the first communication hole 66, and extends upward. Within the electric casing 61, the positive electrode bus bar 33P is connected to the positive electrode terminal of the function expansion circuit 70, and the negative electrode bus bar 33N is connected to the negative terminal of the function expansion circuit 70. Thereby, the electric power control unit 30 and the function expansion circuit 70 are electrically connected. Further, although not illustrated, in the second embodiment, the PN connector 80 is attached to the second service hole 24 of the casing 20. Thereby, the electric power control unit 30 is directly connected to the battery 6, and the function expansion circuit 70 of the electric unit 60 is electrically connected to the battery 6 through the electric power control unit 30. In the second embodiment, the front side surface 21S is an example of the "first surface" in the present disclosure. The upper side surface 23S is an example of the "second surface" in the present disclosure.

Next, the structure of a drive apparatus 10F in a third embodiment will be described with reference to FIG. 5. In the drive apparatus 10F in the third embodiment, the electric power control unit 30 is positioned leftward of the motor 40, similarly to the first embodiment. However, the electric unit 60 is attached to a front side surface 23T of the casing 20. Therefore, in the casing 20 in the third embodiment, the second communication hole 26 is provided on the front side surface 23T. In the third embodiment, the positive electrode bus bar 33P and negative electrode bus bar 33N of the electric power control unit 30 pass through the second communication hole 26 and the first communication hole 66, extend forward, and electrically connect the electric power control unit 30 and the function expansion circuit 70. In the third embodiment, the left side surface 21T is an example of the "first surface" in the present disclosure. The front side surface 23T is an example of the "second surface" in the present disclosure.

Next, a drive apparatus 10F in a fourth embodiment will be described with reference to FIG. 6. In the drive apparatus 10F in the fourth embodiment, the electric power control unit 30 is positioned upward of the motor 40. The electric power control unit 30 is horizontally disposed along an upper side surface 21F of the casing 20. Therefore, in the casing 20 in the fourth embodiment, the second service hole 24 is provided on the upper side surface 21F. Furthermore, in the drive apparatus 10F in the fourth embodiment, the electric unit 60 is attached to a front side surface 23F of the casing 20. In the fourth embodiment, the positive electrode bus bar 33P and negative electrode bus bar 33N of the electric power control unit 30 pass through the second communication hole 26 and the first communication hole 66, extend forward, and electrically connect the electric power control unit 30 and the function expansion circuit 70. In the fourth embodiment, the upper side surface 21F is an example of the "first surface" in the present disclosure. The front side surface 23F is an example of the "second surface" in the present disclosure.

The specific examples of the technology disclosed in the preset specification have been described above in detail. They are just examples, and do not limit the claims. The technology described in the claims includes various modifications and alterations of the specific examples exemplified above. Modifications of the above embodiments will be described below.

A first modification of the embodiments will be described below. The function expansion circuit 70 of the electric unit 60 does not need to include the direct-current converter circuit 70D, the alternating-current charge circuit 70A, and the high-voltage branch circuit 70P. In a further modified example, the function expansion circuit 70 may include any one or any two of the circuits 70D, 70A, 70P.

Next, a second modification of the embodiments will be described. The electric power control unit 30 in the first embodiment may be disposed along the upper side surface 23 of the casing 20.

The technical elements described in the present specification or the drawings exert technical utility independently or by various combinations, and are not limited to the combinations described in the claims at the time of filing. Further, the technology exemplified in the present specification or the drawings can concurrently achieve a plurality of purposes, and has technical utility simply by achieving one purpose of them.

What is claimed is:
1. A drive apparatus comprising:
an electric motor;
a gear that is mechanically connected to the electric motor;
an electric power control unit that is electrically connected to the electric motor; and
a casing that houses the electric motor, the gear, and the electric power control unit, the casing including a fixation portion to which an electric unit for function expansion is attached in a detachable manner and a connection portion by which the electric unit fixed to the fixation portion is electrically connected to the electric power control unit, wherein
the electric unit is attached to the casing,
the drive apparatus is equipped in a vehicle that includes a battery,
one unit of the electric power control unit and the electric unit is directly connected to the battery,
the other unit of the electric power control unit and the electric unit is connected to the battery through the one unit, and
the electric power control unit is disposed on a left side of the electric motor as viewed in a forward movement direction of the vehicle.
2. The drive apparatus according to claim 1, wherein the electric unit includes a direct-current converter circuit, an alternating-current charge circuit, and a high-voltage branch circuit.
3. The drive apparatus according to claim 1, wherein:
the electric power control unit is disposed along a first surface of the casing; and
the electric unit is attached to a second surface of the casing by the fixation portion, the second surface being adjacent to the first surface.
4. A drive apparatus comprising:
an electric motor;
a gear that is mechanically connected to the electric motor;
an electric power control unit that is electrically connected to the electric motor; and
a casing that houses the electric motor, the gear, and the electric power control unit, the casing including a fixation portion to which an electric unit for function expansion is attached in a detachable manner and a connection portion by which the electric unit fixed to the fixation portion is electrically connected to the electric power control unit, wherein
the electric unit is attached to the casing,
the drive apparatus is equipped in a vehicle that includes a battery,
one unit of the electric power control unit and the electric unit is directly connected to the battery,
the other unit of the electric power control unit and the electric unit is connected to the battery through the one unit, and
the electric power control unit is disposed on a forward side of the electric motor as viewed in a forward movement direction of the vehicle.
5. The drive apparatus according to claim 4, wherein:
the electric unit includes a direct-current converter circuit, an alternating-current charge circuit, and a high-voltage branch circuit.
6. The drive apparatus according to claim 4, wherein:
the electric power control unit is disposed along a first surface of the casing, and
the electric unit is attached to a second surface of the casing by the fixation portion, the second surface being adjacent to the first surface.
7. A drive apparatus comprising:
an electric motor;
a gear that is mechanically connected to the electric motor;
an electric power control unit that is electrically connected to the electric motor; and
a casing that houses the electric motor, the gear, and the electric power control unit, the casing including a fixation portion to which an electric unit for function expansion is attached in a detachable manner and a connection portion by which the electric unit fixed to the fixation portion is electrically connected to the electric power control unit, wherein the electric unit is attached to the casing, the drive apparatus is equipped in a vehicle that includes a battery, one unit of the electric power control unit and the electric unit is directly connected to the battery, the other unit of the electric power control unit and the electric unit is connected to the battery through the one unit, and the electric power control unit is disposed on an upward side of the electric motor within the vehicle.

8. The drive apparatus according to claim 7, wherein the electric unit includes a direct-current converter circuit, an alternating-current charge circuit, and a high-voltage branch circuit.

9. The drive apparatus according to claim 7, wherein:

the electric power control unit is disposed along a first surface of the casing; and the electric unit is attached to a second surface of the casing by the fixation portion, the second surface being adjacent to the first surface.

* * * * *